P. H. COYLE.
BOILER TUBE CLEANER.
No. 96,552.           Patented Nov. 9, 1869.
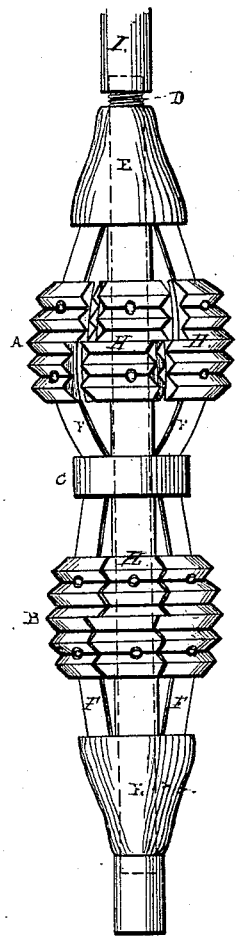
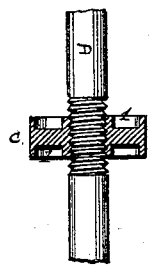
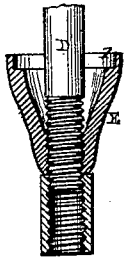
Witnesses.           Inventor.

UNITED STATES PATENT OFFICE.

PATRICK H. COYLE, OF NEWARK, NEW JERSEY.

Letters Patent No. 96,552, dated November 9, 1869.

IMPROVEMENT IN BOILER-TUBE CLEANERS.

The Schedule referred to in these Letters Patent and making part of the same.

*To all whom it may concern:*

Be it known that I, PATRICK H. COYLE, of the city of Newark, county of Essex, and State of New Jersey, have invented certain Improvements in Apparatus for Cleaning Boiler and other Tubes; and I do hereby declare that the following, taken in connection with the drawings which accompany and form part of this specification, is a description of my invention sufficient to enable those skilled in the art to practise it.

My improvements relate to a novel mode of constructing a tube-cleaner, by means of which it is rendered expansible, so as to be adapted to tubes of various sizes, and at the same time is capable of being taken apart, and having any one of the parts of which it is composed replaced by a new one, whenever it becomes too much worn or injured.

Figure 1 represents a plan view of the cleaner, with one part of the cleaning-devices spread or expanded, as seen at A, and a corresponding part, as at B, in its normal or unexpanded condition.

Figure 2 is a longitudinal section through the hub C, and showing a part of the spindle or central supporting-rod D.

Figure 3 is a longitudinal section of one of the heads or caps E, which serve to expand the apparatus.

Figure 4 is one of the disks or heads, which receive and confine the ends of the several spring-pieces F, which compose the scraping or cleaning-portion.

The spindle or handle D is to be of any proper length, and I prefer to have it tubular. It is screw-threaded at those portions where the stationary head C and the adjustable heads E are applied, as shown in the drawings.

These heads C and E are each made with an annular rebate or cavity, 1, adapted to receive a disk or ring, G, which is perforated, as shown at 2 2 in fig. 4, with oblong openings, to receive the ends of springs F F. These springs are flat and slightly bowed, and each end of each spring is inserted in one of the holes in a disk, the latter being first lodged in its respective cavity in the two heads, as seen at A.

Each spring has secured to its outer side, by screws or otherwise, a metallic grooved scraper, H, the grooves running in the arc of a circle, so that when the series of scrapers is close together, as seen at B, each groove forms, with the adjacent ones on the other scrapers, a continuous circular groove.

If tubes to be cleaned were always of the same size, the entire circular scraper might be made in one piece, instead of in a series of sections, as above stated; but it is often found necessary to have a scraper of greater or less diameter, in order to clean successfully under varying sizes and conditions of tubes, and it is therefore important to construct it adapted to tubes of different sizes. I therefore make the parts A B in sections, and by attaching each section to its own spring, it is free to separate from those next it, and move radially outward from the central rod whenever pressure is applied to the ends of the springs. Such pressure is readily applied by simply turning the head E so as to cause it to advance toward the head C. This causes the bulging of each spring, the separation of the scrapers H from each other, and consequently the expansion of the apparatus, as seen at A.

In order to avoid a continuous straight gap or space between the scrapers H, when separated, which would leave corresponding uncleaned portions in the tube, these scrapers are cut zigzag, or irregularly, in almost any form which will accomplish the result. I have shown one of the simplest forms in the drawings, namely, rebates in one, and corresponding projections on the next one, of such depths as to avoid any appreciable gap at the central or highest ridge.

I is a screw-threaded sleeve applied to the end of the rod, and also wherever else desirable.

It will be apparent, from the above description, that not only may a single tube-scraper of this constuction supply the place of several of different sizes, but also, that whilst strong and durable, it is yet capable of very ready and economical repair whenever any of its parts wear or get out of order, for every spring may be easily removed and a new one substituted for it; and likewise each separate scraper H may, when too much worn or dulled, be either sharpened or detached from its spring and another put in its place.

When the segmental scrapers H are not in contact with each other, there is more or less yield to the springs F, which is always desirable, whilst at the same time there is all the rigidity required.

The hub C may be removed, and a head, E, substituted for it, thus making a single tube-cleaner with only one set of springs. Or one of the disks G and its adjacent springs, and their head E, may be removed, thus leaving a single cleaner, having the hub C at one end and an adjustable head, E, at the other end of the springs.

I claim—

A tube-cleaner having short sectional scrapers, each secured upon a bowed spring, and held to place by it only, and in such manner that the heads may be adjusted nearer to each other, to increase the bulge of the springs, without obstruction from the scrapers, substantially as shown and described.

Also, the combination, with the springs and scrapers, of the disks G, the stationary head C, or its equivalent, and an adjustable head, E.

PATRICK H. COYLE.

Witnesses:
HENRY F. HAUREY,
WM. A. HALSEY.